(No Model.)  3 Sheets—Sheet 1.
G. W. BLAKESLEE.
SELF BINDING HARVESTER.
No. 324,524. Patented Aug. 18, 1885.
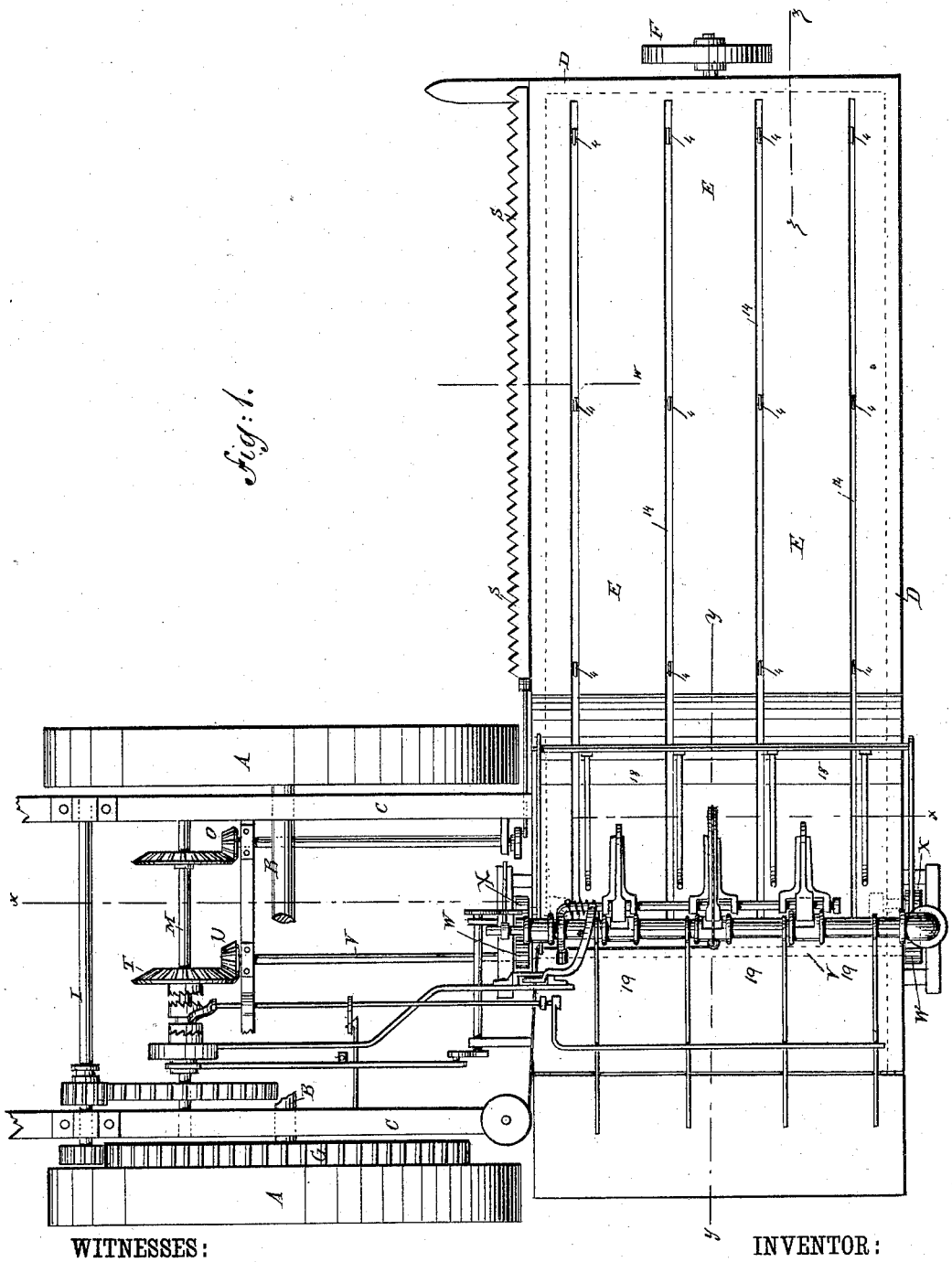
WITNESSES:
INVENTOR:
G. W. Blakeslee
BY Munn & Co
ATTORNEYS.

(No Model.) 3 Sheets—Sheet 2.
G. W. BLAKESLEE.
SELF BINDING HARVESTER.
No. 324,524. Patented Aug. 18, 1885.
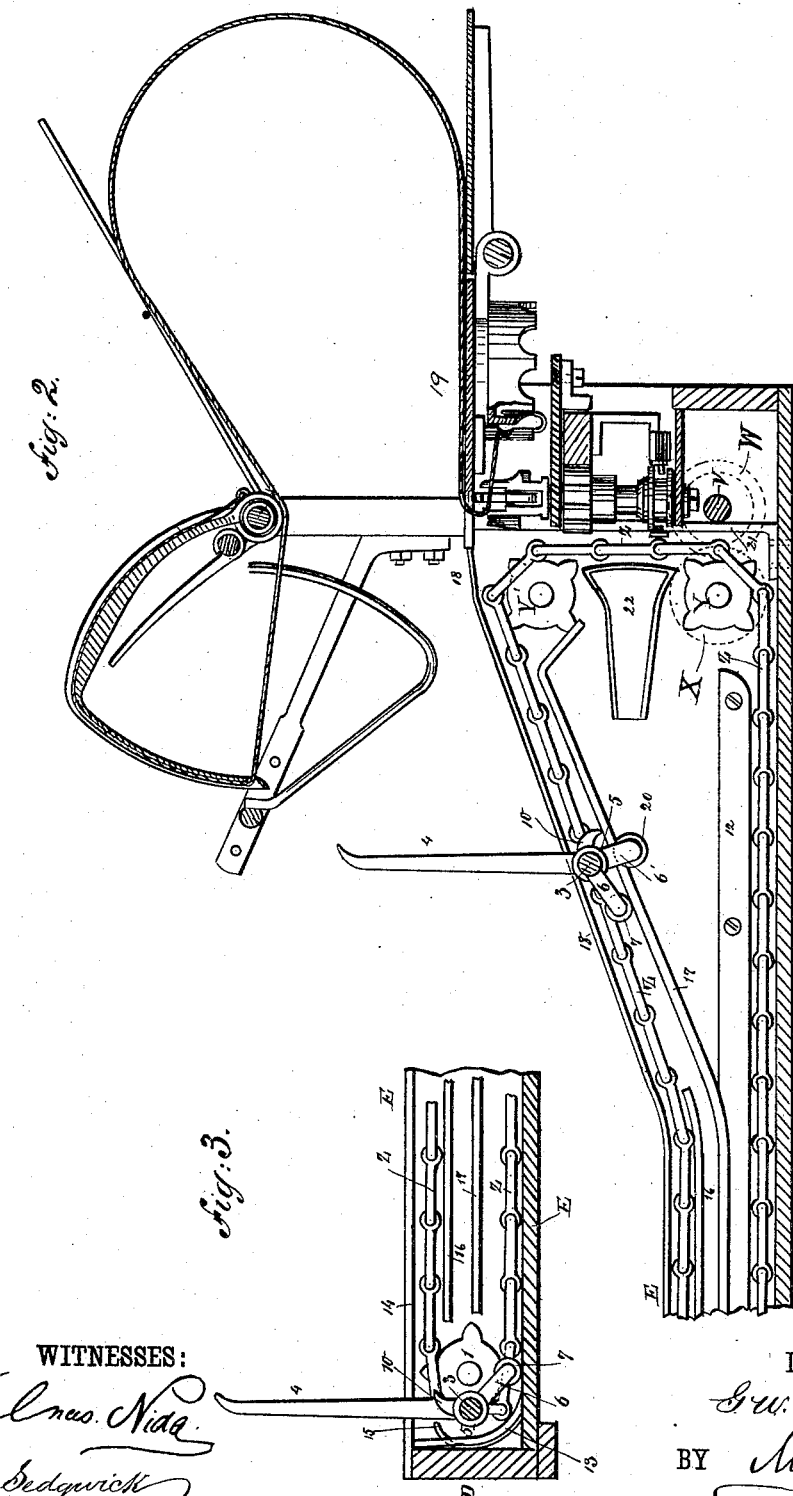
WITNESSES:
INVENTOR:
G. W. Blakeslee
BY Munn & Co
ATTORNEYS.

(No Model.) 3 Sheets—Sheet 3.
G. W. BLAKESLEE.
SELF BINDING HARVESTER.
No. 324,524. Patented Aug. 18, 1885.
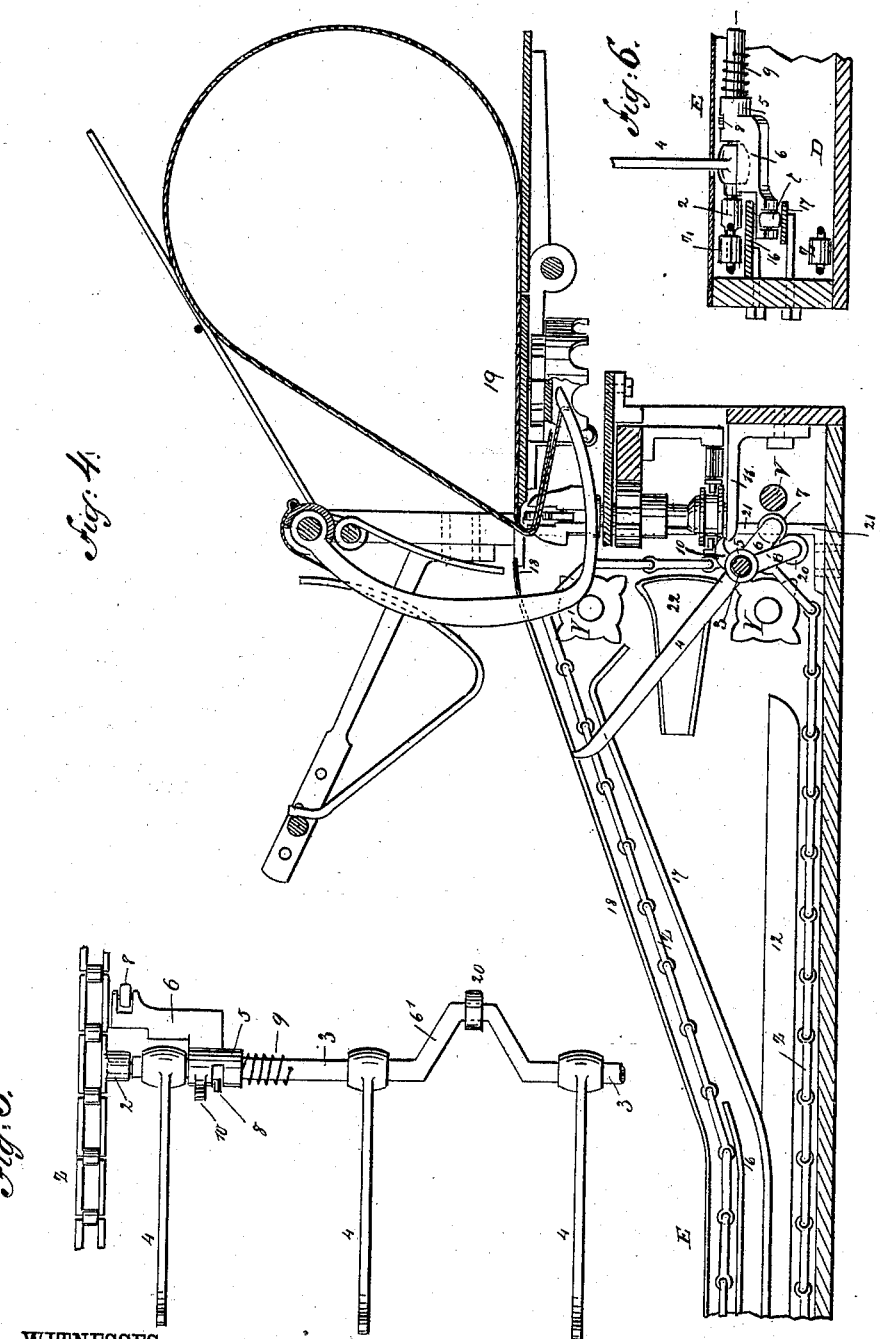
WITNESSES:
Chas Nide
C. Sedgwick
INVENTOR:
G. W. Blakeslee
BY Munn & Co
ATTORNEYS.

United States Patent Office.

GEORGE WILSON BLAKESLEE, OF PERRY, IOWA.

SELF-BINDING HARVESTER.

SPECIFICATION forming part of Letters Patent No. 324,524, dated August 18, 1885.

Application filed March 4, 1884. (No model.)

*To all whom it may concern:*

Be it known that I, GEORGE WILSON BLAKESLEE, of Perry, in the county of Dallas and State of Iowa, have invented certain new and useful Improvements in Self-Binding Harvesters, of which the following is a full, clear, and exact description.

Reference is to be had to the accompanying drawings, forming part of this specification, in which similar letters of reference indicate corresponding parts in all the figures.

Figure 1, Sheet 1, is a plan view of my improvement, parts being broken away. Fig. 2 is a sectional front elevation of a part of the same, taken through line $y\,y$, Fig. 1. Fig. 3 is a sectional front elevation of the outer part of the platform, taken through the line $z\,z$, Fig. 1. Fig. 4 is the same section as Fig. 2, but showing the operating parts in another position. Fig. 5 is a plan view of a part of the rake-head and of one of the endless chains. Fig. 6 is a sectional elevation of a part of the platform, taken through the line $w\,w$, Fig. 1, and showing the end of the rake head and its guides.

The object of this invention is to secure compactness and efficiency in self-binding harvesters, and promote simplicity and cheapness in the construction of such harvesters.

My invention consists in the construction and combination of parts, as will be hereinafter described and claimed. A shaft, M, is journaled transversely in the frame C, and is driven from the drive-wheels A on the axle B through the medium of shaft I and connecting-gearing. The cutter-bar and binding and raking mechanism are operated from this shaft.

Upon the middle part of the shaft M is placed a loose beveled gear-wheel, T, the teeth of which mesh into the teeth of the small beveled gear-wheel U, attached to the forward end of the shaft V. The shaft V is placed at right angles with the axle B and shafts I and M; revolves in bearings attached to the frame C, and has gear-wheels W attached to its middle part and rear end. The teeth of the gear-wheels W mesh into the teeth of the gear-wheels X, the journals of which revolve in bearings in the frame C.

To the inner ends of the journals of the gear-wheels X are attached chain-wheels Y, around which pass endless chains Z. The endless chains Z also pass around chain-wheels 1, pivoted to the outer part of the platform-frame D, and around chain-wheels Y', pivoted to the inner upper part of the said platform-frame D.

Upon the links of the endless chain Z, at intervals of eighteen inches, (more or less,) are formed or to them are attached sockets 2, to receive the ends of the rake-heads 3, to which are rigidly attached four or more rake-teeth, 4.

Upon the end parts of each rake-head 3 are placed sleeves 5, upon the outer ends of which are formed crank-arms 6, having small friction-rollers 7 pivoted to their outer ends. The rocking movements of the sleeves 5 upon the ends of the rake-head 3 are limited by stop-pins 8, attached to the rake-head 3, and which pass through short slots in the said sleeves, as shown in Fig. 5.

Upon the rake-head 3 are placed spiral springs 9, the outer ends of which are attached to the inner ends of the sleeves 5, and their inner ends are attached to the said rake-head 3. The springs 9 are coiled in such a direction as to tend to turn the sleeves 5 upward and inward and the rake-head 3 outward and downward.

Upon the outer parts of the sleeves 5 are formed hook-lugs 10, which, as the rake-head 3 descends vertically at the inner end of the platform E, strike stop-brackets 11, secured to the platform-frame D, and cause the crank-arms 6 to swing inward, so that they will pass beneath the guides 12, attached to the front and rear bars of the platform-frame D, by which the said crank-arms are kept in position while the rake-heads 3 are moving toward the outer end of the platform E, the teeth 4 being held down upon the bottom of the said platform by the tension of the springs 9. As the rake-heads 3 approach the outer end of the platform E the ends of the teeth 4 strike the curved guides 13, attached to the outer end of the platform-frame D, and are raised through slots 14 in the said platform, and as the said rake-heads pass up around the outer chain-wheels 1 the crank-arms 6 are guided by the curved guides 15 into position to enter between the two guides 16 17, attached to the front and rear bars of the platform-frame D. The upper guides, 16, support the rake-heads 3 and chains Z while the said rake-heads are passing inward along the platform E, and thus prevent the rake-teeth 4 from being forced downward into the said platform by the resistance of the grain. The lower guides, 17, support the cranks 6, and hold the rake-teeth 4 from being forced back by the tension of the springs 9 and the resistance of the grain, so that said teeth will retain an erect position while moving inward and collecting the grain upon the platform into a gavel ready for the binder. The platform E is made with an upwardly-inclined inward extension, 18, extending from a point opposite, or nearly opposite, the inner end of the cutter-bar S to the inner edge of the binding-table 19. The upper guide, 16, may terminate at or near the lower end of the inclined extension 18, but the lower guide, 17, extends upward beneath the said extension 18 nearly to the upper chain-wheels, Y'.

Upon the rake-head 3, between its ends and center, are formed cranks 6', to which are pivoted small friction-rollers 20, which, as the rake-head begins its descent from the upper chain-wheels, Y', to the lower chain-wheels, Y, come in contact with vertical guides 21, attached to the frame of the machine, and which hold the rake-teeth 4 in a vertical position while moving downward into the platform. 22 are guides attached to the front and rear bars of the platform-frame D to hold the endless chains vertical against the pressure of the rake-heads while descending from the upper chain-wheels, Y', to the lower ones, Y.

I do not desire to claim the binding mechanism in this application, reserving the right to claim the same in a separate application.

Having thus described my invention, I claim as new and desire to secure by Letters Patent—

1. In a self-binding harvester, the combination, with the platform D E, having slots in its top, the chain-wheels Y Y'1, and a driving mechanism, of the endless chains Z, having sockets 2, the rake-heads 3, having teeth 4, the cranks 6 6', and the guides 12 13 15 16 17 21 22, whereby the rake-teeth are projected, carry the grain from the grain-receiving platform, and force it on the binder-platform, and then pass down beneath the grain-receiving platform, as set forth.

2. In a self-binding harvester, the combination, with the rake-head 3, the endless chains Z, and the guides 16 17, of the crank-arm 6, stop 8, and the spiral spring 9, whereby the rake-teeth are held erect while carrying the grain from the grain-receiving platform and forcing the grain on the binding-platform, as set forth.

3. In a self-binding harvester, the combination, with the platform D E, the rake-head 3, the crank 6, and the spring 9, of the hook 10 and the bracket 11, substantially as herein shown and described, whereby the said crank-arm is thrown inward and the teeth turned down outward to pass back beneath the grain-receiving platform, as set forth.

4. The rake-head 3, provided with teeth 4, in combination with the sleeve 5, loosely mounted on the rake-head, and provided with the crank 6, hook 10, and the spring 9, connecting the sleeve and head, substantially as set forth.

5. The rake-head 3, stop 8, and teeth 4, in combination with the slotted sleeve 5, spring 9, secured to the sleeve and head, as described, hook 10, and crank 6 on said sleeve, substantially as set forth.

GEORGE WILSON BLAKESLEE.

Witnesses:
ALBERT CARDELL,
HOWARD A. ROUSE.